Figure 1:
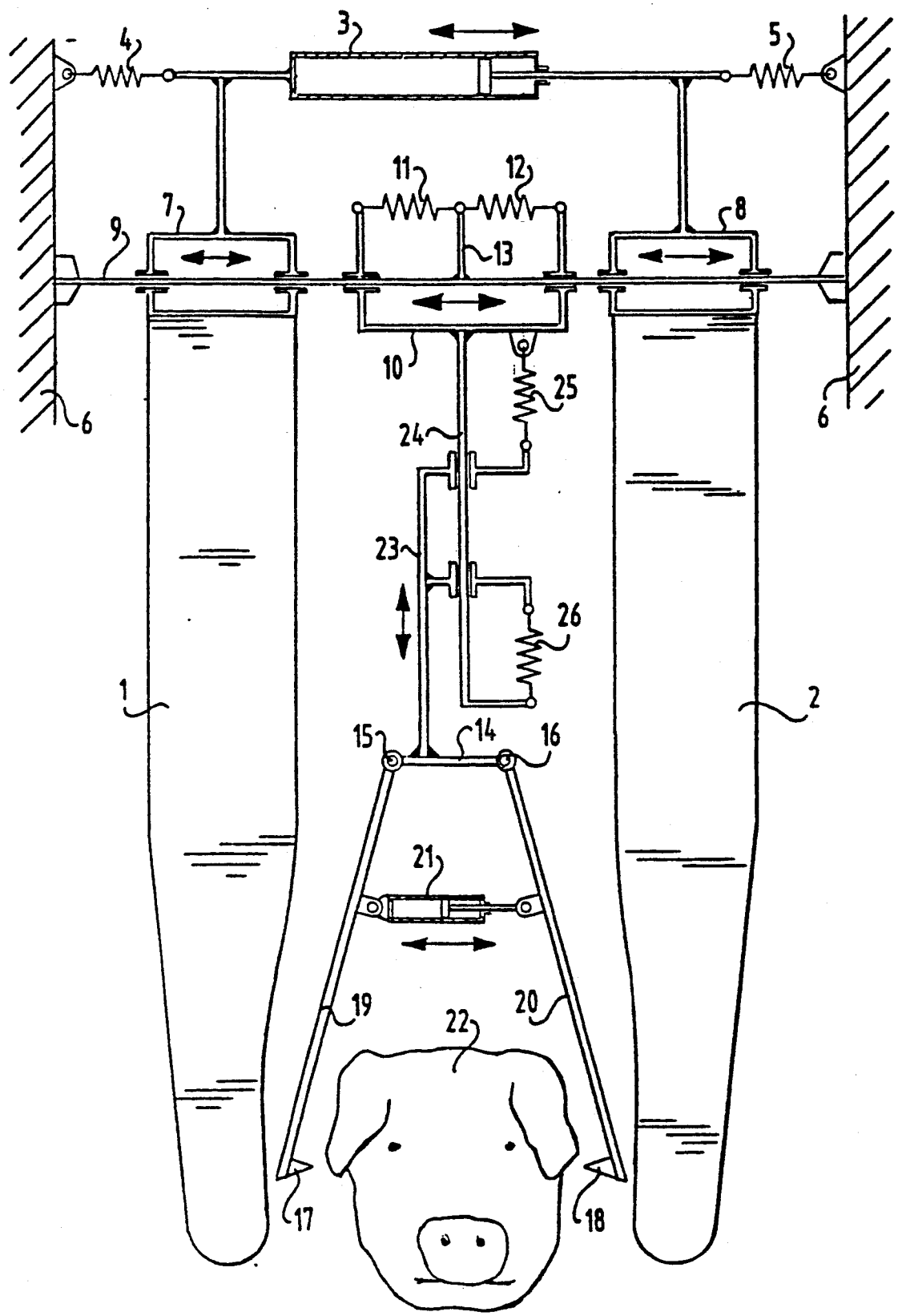

United States Patent

Bernardus et al.

[11] Patent Number: 5,326,307
[45] Date of Patent: Jul. 5, 1994

[54] STUNNING DEVICE FOR ANIMALS FOR SLAUGHTER

[75] Inventors: Wilhelmus A. Bernardus, Lichtenvoorde; Hendrik J. Pardijs, Winterswijk, both of Netherlands

[73] Assignee: Stork RMS B.V., Lichtenvoorde, Netherlands

[21] Appl. No.: 42,481

[22] Filed: Apr. 2, 1993

[30] Foreign Application Priority Data

Apr. 2, 1992 [NL] Netherlands ............ 92.00622
Dec. 23, 1992 [NL] Netherlands ............ 92.02249

[51] Int. Cl.⁵ .................................. A22B 3/06
[52] U.S. Cl. .................................... 452/58
[58] Field of Search ....................... 452/58, 57

[56] References Cited

U.S. PATENT DOCUMENTS

| | | | |
|---|---|---|---|
| 4,361,932 | 12/1982 | Nijhuis | 452/58 |
| 4,406,036 | 9/1983 | Nijhuis | 452/58 |
| 4,578,841 | 4/1986 | Nihjuis | 452/58 |
| 4,586,216 | 5/1986 | Grajoszex | 452/58 |
| 4,747,184 | 5/1988 | Winsloe | 452/58 |

FOREIGN PATENT DOCUMENTS

| | | |
|---|---|---|
| 902.574 | 9/1985 | Belgium . |
| 021548 | 1/1981 | European Pat. Off. . |
| 190780A1 | 8/1986 | European Pat. Off. . |
| 396148A2 | 11/1990 | European Pat. Off. . |
| 955386 | 7/1956 | Fed. Rep. of Germany . |
| 2390903 | 12/1978 | France . |
| 7904935 | 12/1980 | Netherlands . |
| 157020 | 11/1932 | Switzerland . |
| 2170088 | 7/1986 | United Kingdom . |

OTHER PUBLICATIONS

Englishg Language Translation of Swiss Patent No. 157,020.
English Language Translation of Belgium Patent No. 902.574.
English Language Translation of European Patent No. 0,396,148.

*Primary Examiner*—Willis Little
*Attorney, Agent, or Firm*—Willian, Brinks, Hofer Gilson & Lione

[57] ABSTRACT

A device for stunning animals for slaughter, such as pigs, sheep and the like. Prior to slaughter of the animal a stunning treatment takes place, wherein a current pulse is carried through the head of the animal. Use is made for this purpose of two electrodes which are pressed from two opposite sides against the head of the animal. After the electrodes have been thus pressed on, a current is passed through the electrodes whereby the animal is stunned.

In this respect the device according to the invention has the special feature that the electrodes have in substantially vertical direction an independent first translation degree of freedom.

23 Claims, 2 Drawing Sheets

STUNNING DEVICE FOR ANIMALS FOR SLAUGHTER

Described in the as yet unpublished Netherlands patent application NL-92 00104 of applicant is a device for stunning animals for slaughter such as pigs, sheep and the like. Prior to slaughter of the animal a stunning treatment takes place, wherein a current pulse is carried through the head of the animal. Use is made for this purpose of two electrodes which are pressed from two opposite sides against the head of the animal. After the electrodes have been thus pressed on, a current is passed through the electrodes whereby the animal is stunned.

It has been found that during such a stunning treatment a cramp state occurs in the muscles of the neck and/or back of the animal, whereby the head moves upward with force. This can have an adverse effect on the pressed-on position of the electrodes, which may be to the detriment of the quality of the stunning.

The object of the invention is to embody a stunning device such that the electrodes are held with complete reliability in the desired pressed-on position during the whole time the current flow through the head takes place.

In this respect the device according to the invention has the special feature that the electrodes have in substantially vertical direction an independent first translation degree of freedom. The electrodes can be held at rest in a predetermined reference position. Spring means for instance can be used for this purpose.

It is noted that a stunning device is known from NL-A-7904935 wherein the electrodes are suspended for swinging. Because they can swing in a vertical plane the electrodes have two coupled degrees of freedom, one horizontal and one vertical. In the freely suspended situation the horizontal degree of freedom dominates, while the vertical degree of freedom is dependent on the horizontal degree of freedom and corresponds to a second order effect. This construction according to the prior art is therefore not capable of following the actual movement of the head of an animal during passage of the current pulse, whereby the desired press-on reliability of the electrodes cannot be guaranteed.

In preference the device has the particular feature that the electrodes have in horizontal direction an independent second translation degree of freedom, the directions of which first and second degrees of freedom define a plane lying in lengthwise direction of an animal for treating. This embodiment has the advantage that the electrodes are capable in this manner of following the movement of the head of the animal during passage of the current pulse through the head.

The above described embodiments have in common that the electrodes are movable in a substantially vertical plane. It can occur under given conditions that the upward directed movement of the head also has a lateral component. In order to also ensure in such a case that press-on of the electrodes is maintained, the electrodes can advantageously be movable independently of each other.

It has been found that the said involuntary movement of the head during passage of the current pulse takes place substantially round a pivot centre line situated in a region in the back zone of the animal. It can be assumed that this imaginary pivot centre line lies at roughly the same position for animals of comparable length. This offers, for the best possible following of the movement of the head, the possibility that the electrodes are movable round a centre line substantially coinciding with the pivot centre line around which the head of an animal for stunning moves as a result of passage of the current pulse.

Alternatively the electrodes can be disposed for swivelling. Always a condition here of course is that the electrodes can be pressed with a desired force against the head of the animal prior to passage of the current pulse. The electrodes can for instance be carried by coil springs.

In order to enable, as stated above, a lateral motion of the electrodes a particular embodiment can have the special feature that the electrodes have a third translation degree of freedom. This degree of freedom does not have to be independent.

In the case of a swivelling movement of the electrodes it must preferably be prevented that sliding of the electrodes occurs relative to the contact surface with the head. For this purpose the device can have the feature that the electrodes are rotatable round a centre line lying in a horizontal plane and substantially transversely of the lengthwise direction of an animal for stunning, and thus have a rotation degree of freedom. The electrodes can further be carried by arms which can be swivelled round the said pivot centre line, in which case the electrodes do not have to be pivotable relative to these arms. The desired rotation can also be achieved by coupling the electrodes to coil springs.

Figure 2:
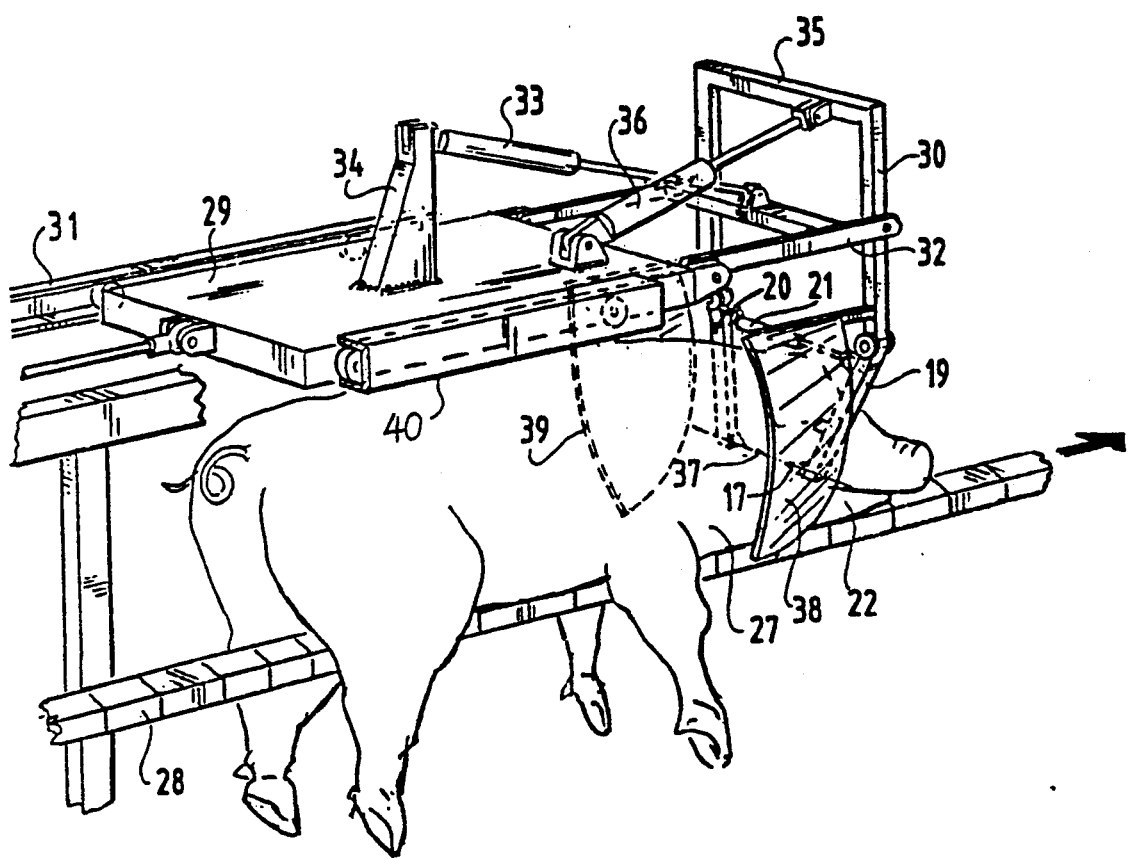

The invention will now be elucidated with reference to the annexed drawing, wherein:

FIG. 1 shows a schematic front view of a device according to the invention in a first embodiment; and FIG. 2 shows a partly broken away perspective view of a second embodiment.

Reference is first made to FIG. 1.

Two side guide members 1, 2 restrict the freedom of the head of the animal, as described in the cited Netherlands patent application 92 00104. Use is made for this purpose of a cylinder 3 which, under the influence of a control system (not shown), can vary in length counter to the spring force of two springs 4, 5 which are connected to a schematically designated frame 6. The ends of cylinder 3 are connected respectively to a guide 7 and 8, which guides can be guided over a guide rod 9 connected to the frame. The side guide members 1, 2 are connected respectively to the guides 7, 8. It will be apparent that cylinder 3 can be of the single-action type, presses the side guide members 1, 2 toward each other in its energized situation and that the springs 4, 5 serve for re-setting to the rest position.

The guide rod 9 further bears a guiding 10 guided slidably thereover. This guiding 10 is coupled via springs 11, 12 to the guide rod 9. Because the meeting point 13 of the springs 11, 12 is connected in the manner shown in the FIGURE to the guide rod 9, they thus define a rest position of the guiding in relation to the guide rod 9.

The guiding 10 thus reciprocally movable counter to the force of the springs 11, 12 supports a frame 14 which via hinges 15, 16 bears arms 19, 20 carrying electrodes 17, 18. These arms 19, 20 can be swivelled by means of a cylinder 21 which can likewise be controlled by way of means (not drawn) between a position in which the electrodes 17, 18 press with a desired force against the head 22 of an animal for stunning and a second position in which the electrodes are free.

The frame 14 is supported for up and downward movement by the guiding 10 via a guide 23 slidable over a guide rod 24 which is connected to guiding 10. Guide 23 is coupled via a spring 25 to the horizontal guiding 10 and via spring 26 to guide rod 24. If desired, spring 26 can be replaced by a rigid coupling.

In the above described manner the desired horizontal and vertical movement of the electrodes 17, 18 is guaranteed.

FIG. 2 shows a pig 27 which is carried by a so-called restrainer 28. A pig 27 for treating lies sedately on this restrainer embodied as a conveyor belt and is transported lying thereon at a determined speed. When the head 22 of the pig has reached the electrodes 17, 18 pressing of these electrodes in tipped form against head 22 takes place by energizing the cylinder 21. By way of means such as a hydraulic cylinder (not shown) a carriage 29, which carries the electrodes 17, 18 by means of a frame 30, is driven at the same speed as restrainer 28. The electrodes 17, 18 can thus follow the pig 27 during the stunning treatment. It will be apparent that the time for which the carriage 29 must move along with the pig corresponds with the time for which the current pulse must be passed through the electrodes 17, 18.

Carriage 29 is guided rollably in rails 31, 40 extending parallel to restrainer 28.

The frame 30 is pivotally supported by a second frame 32 which is in turn pivotally supported by carriage 29. The frame 32 can swivel relative to the carriage under the influence of a cylinder 33 which is coupled on one side to the frame 32 and on the other side to a protrusion 34 on carriage 29.

The swivel frame 30 has an upward protruding part with horizontal arm 35, which arm is connected via a second cylinder 36 to the carriage 29.

It is noted for the sake of completeness that control of cylinders 3, 21, 33, 36 and the drive cylinder for the reciprocating movement of carriage 29 are not drawn. Also dispensed with is drawing of the electrical unit which provides the passage of a current pulse via the electrodes 17, 18.

As remarked above, the carriage 29 is moved along with the pig 27 prior to passage of the current pulse through electrodes 17, 18. The cylinder 36 is placed in a fixed position while cylinder 33 is controlled such that it can operate as a spring. As a result of the construction shown the electrodes 17, 18 are movable in a substantially vertical plane round a pivot centre line 37. This is the centre line around which the head 22 of the animal will move owing to contraction of the neck muscles during passage of the current pulse. This construction ensures that the electrodes 17, 18 remain pressed in the correct manner against the head and ensures the quality of the stunning.

After the stunning operation has been performed the cylinder 33 is placed in a fixed position and cylinder 36 is energized to pull toward it the arm 35, whereby the lower part of the frame 30 with the electrodes 17, 18 is folded upward. In this situation the device is ready for stunning of the following pig and the carriage 29 can move back to its starting position.

Connected to the first frame 30 are curved plates 38, 39 which serve during delivery of an animal 27 to correctly position the head 22 in relation to the electrodes 17, 18. As shown in FIG. 2, the aligning plates 38, 39 have for this purpose a form such that they together form a generally funnel-shaped outer surface, whereby a correct positioning of the head 22 facing to the front is always ensured.

Attention is drawn to the fact that the aligning plates 38, 39 can be the electrodes themselves, in which case the electrodes 17, 18 and the associated support and control construction could be omitted. It is however pointed out in this respect that, given present insights, it is recommended to choose the shape of the electrodes 17, 18 such that at least the outer portion of the skin of the head 22 is slightly penetrated to ensure an optimal passage of current. To this end the electrodes can have tips, have a sharp edge or have a number of sharp portions disposed for instance in a ring.

We claim:

1. A device for stunning an animal comprising:
   two electrodes for pressing against a head of the animal;
   a support frame;
   the two electrodes mounted relative to the support frame such that the electrodes have a first independent translation degree of freedom in a substantially vertical direction when the electrodes are pressed against the animal's head; and
   a moving guide mounted relative to the support frame, the moving guide being movable in the substantially vertical direction to provide the first independent translation degree of freedom.

2. The device of claim 1 wherein the electrodes have a second independent translation degree of freedom in a horizontal direction.

3. The device of claim 2 wherein the electrodes have a third translation degree of freedom.

4. The device of claim 1, wherein the electrodes are moveable independently of each other.

5. The device of claim 1, wherein the electrodes are movable around a first center line that substantially coincides with a second center line;
   the second center line being an axis around which the animal's head moves when stunned.

6. The device of claim 1, wherein the electrodes are mounted such that they can swivel.

7. The device of claim 1, wherein the electrodes are mounted such that they can rotate.

8. The device of claim 1, wherein a non-rigid coupling engages the moving guide to allow the first independent translation degree of freedom.

9. The device of claim 8, wherein the non-rigid coupling is a spring.

10. The device of claim 1, further comprising:
    two arms; and
    a guide frame connected to the moving guide;
    the two arms pivotally connected to the guide frame; and
    one of the electrodes connected to each arm.

11. A device for stunning an animal comprising:
    two electrodes for pressing against a head of the animal; and
    a support frame;
    the two electrodes mounted relative to the support frame such that the electrodes have a first independent translation degree of freedom in a substantially vertical direction when the electrodes are pressed against the animal's head;
    the electrodes having a second independent translation degree of freedom in a horizontal direction; and
    a moving guiding mounted relative to the support frame, the moving guiding being moveable in the horizontal direction to provide the second independent translation degree of freedom.

12. The device of claim 11, wherein a first non-rigid coupling engages the moving guide to allow the first independent translation degree of freedom; and
   a second non-rigid coupling engages the moving guiding to allow the second independent translation degree of freedom.

13. The device of claim 12, wherein each non-rigid coupling comprises a spring.

14. The device of claim 11, further comprising:
   two arms; and
   a guide frame connected to the moving guide;
   the two arms pivotally connected to the guide frame;
   one of the electrodes connected to each arm.

15. The device of claim 11, wherein the moving guide is connected to the moving guiding by at least one non-rigid coupling.

16. The device of claim 15, wherein each non-rigid coupling comprises a spring.

17. A device for stunning an animal comprising:
   two electrodes for pressing against a head of the animal;
   a support frame;
   two arms mounted relative to the support frame;
   one of the electrodes connected to each arm;
   the electrodes having a first independent translation degree of freedom in a substantially vertical direction when the electrodes are pressed against the animal's head; and
   a moving guide mounted relative to the support frame, the moving guide being movable in the substantially vertical direction to provide the first independent translation degree of freedom.

18. A device for stunning an animal comprising:
   two electrodes for pressing against a head of the animal; and
   a carriage;
   the two electrodes mounted relative to the carriage such that the electrodes have an independent translation degree of freedom in a substantially vertical direction when the electrodes are pressed against the animal's head.

19. The device of claim 18, wherein the electrodes are alignment plates.

20. The device of claim 18, further comprising:
   two arms to which the electrodes are connected;
   a first frame pivotally connected to the two arms; and
   a second frame pivotally connected to the first frame and pivotally connected to the carriage.

21. The device of claim 20, further comprising a cylinder connected at one end to the second frame and connected at an opposite end to the carriage.

22. The device of claim 20, further comprising a cylinder connected at one end to the first frame and connected at an opposite end to the carriage.

23. The device of claim 18, wherein the electrodes are movable around a first center line that substantially coincides with a second center line;
   the second center line being an axis around which the animal's head moves when stunned.

* * * * *

UNITED STATES PATENT AND TRADEMARK OFFICE
CERTIFICATE OF CORRECTION

PATENT NO. : 5,326,307
DATED : July 5, 1994
INVENTOR(S) : Wilhelmus A. Bernardus Te Dorsthorst It is certified that error appears in the above-indentified patent and that said Letters Patent is hereby corrected as shown below:

Items [19] and [75],

On the cover page, please delete "Bernardus et al." and substitute --Te Dorsthorst et al.--.

On the cover page, after "Bernardus" in line 1 of the "Inventors" information, insert --Te Dorsthorst--.

Signed and Sealed this

Twenty-sixth Day of September, 1995

*Attest:*

BRUCE LEHMAN

*Attesting Officer*　　*Commissioner of Patents and Trademarks*